US009563845B1

(12) United States Patent
Porter et al.

(10) Patent No.: US 9,563,845 B1
(45) Date of Patent: Feb. 7, 2017

(54) RULE EVALUATION BASED ON PRECOMPUTED RESULTS

(71) Applicant: AMAZON TECHNOLOGIES, INC., Reno, NV (US)

(72) Inventors: Brandon William Porter, Yarrow Point, WA (US); Robert Stanley Bailes, Sammamish, WA (US); Aaron Ben Fernandes, Redmond, WA (US); Michael James McInerny, Seattle, WA (US); Vishal Parakh, Seattle, WA (US); Harsha Ramalingam, Kirkland, WA (US); Karthik Tamilmani, Redmond, WA (US)

(73) Assignee: Amazon Technologies, Inc., Reno, NV (US)

(*) Notice: Subject to any disclaimer, the term of this patent is extended or adjusted under 35 U.S.C. 154(b) by 429 days.

(21) Appl. No.: 14/297,014

(22) Filed: Jun. 5, 2014

(51) Int. Cl.
H04L 12/26 (2006.01)
G06N 5/02 (2006.01)
H04L 29/08 (2006.01)
G06F 11/34 (2006.01)

(52) U.S. Cl.
CPC ........... *G06N 5/022* (2013.01); *G06F 11/3438* (2013.01); *H04L 12/26* (2013.01); *H04L 67/22* (2013.01)

(58) Field of Classification Search
CPC ...... G06F 11/3438; H04L 67/22; H04L 12/26; G06N 5/022
See application file for complete search history.

(56) References Cited

U.S. PATENT DOCUMENTS

| 5,987,611 | A  | * | 11/1999 | Freund | G06F 21/552 726/4 |
| 6,345,288 | B1 | * | 2/2002 | Reed | H04L 63/045 707/999.001 |
| 6,407,753 | B1 | * | 6/2002 | Budinsky | G06N 5/022 706/59 |
| 6,446,119 | B1 | * | 9/2002 | Olah | G06F 11/3423 709/223 |
| 7,680,848 | B2 | * | 3/2010 | Janedittakarn | G06F 17/30424 707/613 |
| 2002/0123992 | A1 | * | 9/2002 | Goldick | G06F 8/71 |
| 2004/0006621 | A1 | * | 1/2004 | Bellinson | G06F 17/30867 709/225 |
| 2005/0063365 | A1 | * | 3/2005 | Mathew | G06Q 10/10 370/352 |

(Continued)

Primary Examiner — Stanley K Hill
Assistant Examiner — Thomas Fink
(74) Attorney, Agent, or Firm — Lindauer Law, PLLC

(57) ABSTRACT

Techniques are described for employing precomputed results of applying rules to content items, the rules applicable to determine whether content items may be electronically published. On receiving a request for a content item, rules applicable to the content item may be identified. A datastore of precomputed results of rule application may be accessed to determine whether the datastore includes a result of applying a current or previous version of each rule. If the datastore includes a current result, the current result may be employed in determine whether the content item may be presented. If the datastore includes a previous result, the previous result may be so employed. If the datastore includes a previous result or no appropriate result, a job may be queued to calculate the current result asynchronously relative to the request for the content item.

20 Claims, 10 Drawing Sheets

(56) References Cited

U.S. PATENT DOCUMENTS

2007/0050444 A1* 3/2007 Costea ................. H04L 12/585
 709/202
2008/0256014 A1* 10/2008 Gould ....................... G06F 8/10
 706/48

* cited by examiner

RULE EVALUATION BASED ON PRECOMPUTED RESULTS

BACKGROUND

An organization engaged in software development, electronic commerce, or other types of services may generate and consume a large quantity of data regarding operations of the organization. Such data may be analyzed through the execution of any number of jobs, and the results of such jobs may be provided to data consumers who are internal to or external to the organization. Because the results of the executed jobs may be employed in subsequent operations related to marketing, inventory management, system design, personnel, and so forth, delays or failures in job execution may delay or otherwise adversely affect such subsequent operations.

Figure 1:
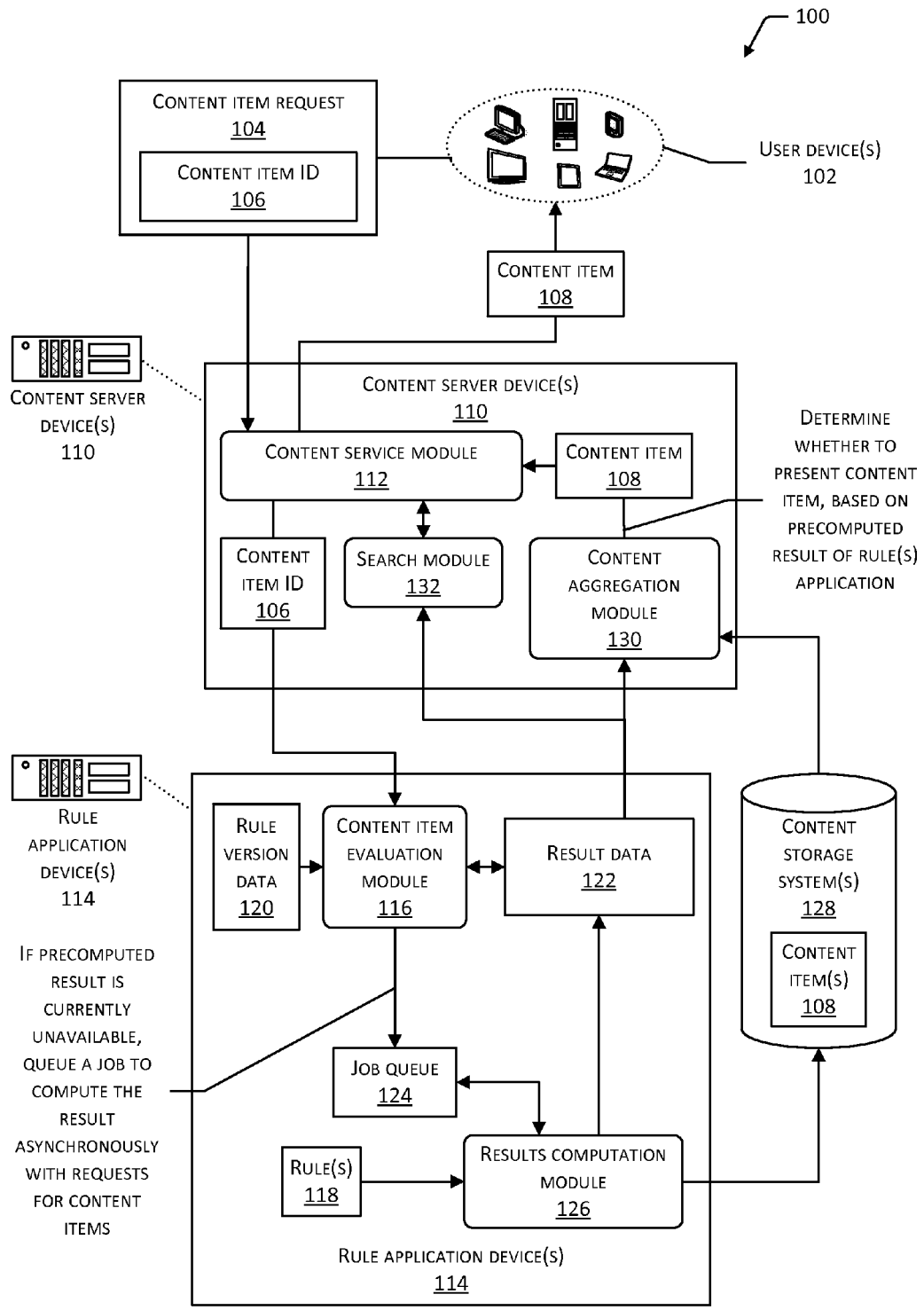
FIG. 1 depicts an environment including one or more rule application devices configured to apply rule(s) for determining whether content item(s) are to be presented, based on requests for the content item(s) received at one or more content server devices.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for employing stored, precomputed results of rule application in scenarios where rules are to be applied to determine whether content items are to be presented, or in other scenarios. In some implementations, a request may be received for a content item to be presented through an application executing on a user device, such as through a web browser. In some cases, a content server device or other computing device receiving the request may determine that a rule is to be applied to the requested content item. The rule may implement a policy or business decision as to which content items are appropriate for presentation. For example, a rule may apply a policy that a content item is not to be presented, through a web site or otherwise, if the content item includes one or more of: potentially offensive content; profane, obscene, or prurient content; sensitive or confidential personal information regarding one or more users; content that is subject to copyright, trademark, or service mark protections; and so forth. The application of a rule may include any number of operations to evaluate or otherwise analyze any number of aspects or features of a content item.

In some cases, the application of a rule may be computationally expensive in that it consumes a substantial amount of processing, storage, or networking resources on one or more computing devices. For example, a rule to identify potentially offensive, obscene, prurient, copyrighted, or confidential text information in a content item may include analyzing a content item using one or more computationally expensive text analysis operations. Such operations may include, but are not limited to, regular expression searches, natural language analyses, machine learning based operations, comparison of text elements to one or more dictionaries of disallowed terms or phrases, and so forth. As another example, a rule to identify potentially offensive, obscene, prurient, copyrighted, or confidential images in a content item such as still images or frames of a video may employ one or more computationally expensive operations including, but not limited to, pattern recognition algorithms, comparison of image elements to collections of other images, image processing operations for color modification, boundary recognition, compression, decompression, watermark detection, format conversion, resolution modification, and so forth. Moreover, in some cases the application of a rule may be computationally expensive because applying the rule includes performing operation(s) against a large number of records in a dataset.

In some cases, rule(s) may be applied substantially in real time following the receipt of a request for a content item. The application of a rule in real time, or substantially in real time, may include performing one or more operations to apply the rule within a predetermined time period after receiving the request for the content item. In some cases, the application of a rule in real time, or substantially in real time, may include launching the operation(s) to apply the rule synchronously with the request for the content item. A synchronous application of a rule may include applying the rule within a same execution path as the process that received and analyzed the request for the content item. For example, an executing process may receive and analyze the request for the content item, and the same process may itself perform the operation(s) to apply to the rule to the content item. Alternatively, the receiving process may launch, spawn or otherwise execute one or more other processes, subprocesses, or threads to begin performing the operation(s).

The rule(s) may be defined within a business or other organization that provides a web site or that otherwise delivers information over a network. In some cases, the application of a rule synchronously with, or substantially in real time following, the receipt of a request for a content item may be based on a decision that the rule is to be applied within a predetermined (e.g., short) period of time following the request. For example, an organization may host content that is posted to a web site by customers or other users, and the organization may seek to quickly identify posted content that is potentially fraudulent, potentially offensive to users, or that otherwise is in violation of a content publication policy of the organization. As another example, a business may host web sites of online merchants and may seek to quickly apply rules in time-sensitive situations, such as when merchants go on vacation, when merchants provide limited time offers of products or services, when tax rates change, when there is a holiday in a particular region, and so forth. In cases where it is computationally expensive to apply a rule to a content item, re-computing the result of rule substantially in real time or synchronously with respect to a request for the content item may delay those operations that consume or otherwise depend on the result. For example, performing a computationally expensive set of operations to apply a rule to a requested content item substantially in real time or synchronously with the request may delay the presentation of the content item, leading to a reduction in sales transaction, a degradation of user experience through a web site, or other negative effects.

Accordingly, implementations employ stored, precomputed results of rules to expedite the substantially real time or synchronous application of rules to content items. In some implementations, data storage may store precomputed results of applying one or more versions of one or more rules to content items. On receiving a request for a content item to be presented on a user device, implementations may determine whether the data storage stores a result of applying a current version of the rule to the content item. If so, that result may be retrieved and employed (e.g., substantially in real time) to determine whether the content item is to be delivered for presentation. If the data storage stores a result of applying a previous version of the rule to the content item, the stored result may be retrieved and employed (e.g., substantially in real time) to determine whether the content item is to be delivered for presentation. A job may then be added to a queue to execute asynchronously (e.g., at a later time, not in real time with the request) to compute a current result of applying the current version of the rule to the content item and to store the current result in the data storage. If the data storage does not store a result of applying any version of the rule to the content item, a default result may be employed and the rule application job may be added to the queue. Accordingly, implementations provide a technique for providing the result of applying the rule substantially in real time or synchronously with the request for a content item, while mitigating the performance impact of re-computing the result in real time.

FIG. 1 depicts an environment 100 including one or more user devices 102. The user device(s) 102 may comprise any type of computing device, including but not limited to a personal computer, a network computer, a cloud computing or distributed computing device, a smartphone, a tablet computer, a wearable computer, an implanted computer, a mobile gaming device, an electronic book reader, an automotive computer, a desktop computer, a laptop computer, a thin client, a terminal, a game console, a smart appliance, a home entertainment device, and so forth. Although examples herein may describe the user device(s) 102 as physically separate devices, implementations are not so limited. In some cases, the user device(s) 102 may include one or more of a virtual computing environment, a hypervisor, a device emulation, or a virtual machine executing on one or more physical computing devices.

A user device 102 may be employed by a user to generate and send a content item request 104. The content item request 104 may include a content item identifier (ID) 106 that identifies a content item 108 to be presented on the user device 102. In some cases, the content item request 104 may be generated and sent through a web browser executing on the user device 102. In such cases, the content item request 104 may be specified according to a protocol such as a version of Hypertext Transport Protocol (HTTP), HTTP Secure (HTTPS), File Transfer Protocol (FTP), and so forth. The content item ID 106 may be specified as a Uniform Resource Identifier (URI), such as a Uniform Resource Locator (URL) or Uniform Resource Name (URN) that provides a network location of a page that includes the requested content item 108. Alternatively, the content item request 104 may be generated and sent from a native application executing on the user device 102, to request that a content item 108 be presented through a user interface of the native application. In such cases, the native application may include any type of application that executes, at least in part, outside of a web browser on the user device 102.

Implementations support any type or format of content within the content item 108, including but not limited to one or more of the following:

Text content, including any amount of alphanumeric or symbolic character text described using any character set or code page, such as any version or subset of the Unicode character standard. Text components may also include metadata described using a markup language, such as any version of Hypertext Markup Language (HTML), Dynamic HTML (DHTML), Extensible HTML (XHTML), Extensible Markup Language (XML), and so forth;

Script files or program modules that provide dynamic content using any scripting or programming language, including any version of JavaScript™, VBScript™, Perl™, Common Gateway Interface (CGI), Cascading Style Sheets (CSS), other types of style sheets, and so forth;

Image files in any format, such as a version of the Joint Photographic Experts Group (JPEG) format, the Graphics Interchange Format (GIF), the Bitmap (BMP) image file format, and so forth; or Audio, video, audio-visual, or multimedia content files in any format, such as a version of the Waveform Audio File Format (WAV), the AU file format, the Moving Picture Experts Group (MPEG) formats such as MPEG-1, MPEG-2, MP3, or MPEG-4 formats, the Audio Video Interleave (AVI) format, and so forth.

In some cases, the content item request 104 may include multiple content item IDs 106, requesting the presentation of multiple content items 108 on the user device 102. Alternatively, the content item request 104 may not include a particular content item ID 106, and may instead include other information to be used to identify one or more content items 108 to be presented on the user device 102. For example, the content item request 104 may include a search query of one or more search terms, and may request the delivery of one or more content items 108 that correspond to the search query. Moreover, although examples herein may describe the content item 108 as web content to be presented within a web browser, implementations are not so limited. Implementations also support content items 108 that are presentable through other applications executing on the user device 102. For example, implementations support the delivery of content items 108 that are presentable through a native application executing on the user device 102, where the native application may be written and compiled to execute on the particular processor hardware and operating system supported by the user device 102.

Implementations support any type of content in the content item(s) 108 that are presentable on the user device 102. In some cases, a content item 108 may include text, image, or other data describing a product or service that is made available to users of the user device(s) 102 through a web site or an application executing on the user device(s) 102. In some cases, the content item(s) 108 may include public postings to a social network web site or application, product review web site or application, public message board, weblog, and so forth. In some cases, the content item(s) 108 may include the results of searching the web, or searching some other information repository, based on a search query of one or more search terms. Implementations also support other types of content in the content item(s) 108.

The content item request(s) 104 may be communicated over one or more networks to one or more content server device(s) 110. The content server device(s) 110 may comprise any type of computing device, including but not limited to the types of computing devices described with reference to the user device(s) 102. In some cases, two or more of the content server devices 110 may comprise a cluster, cloud, farm, or other grouping of multiple devices that coordinate operations to provide load balancing, failover support, parallel processing capabilities, shared storage resources, or other aspects. Although examples herein may describe the content server device(s) 110 as physically separate devices, implementations are not so limited. In some cases, the content server device(s) 110 may include one or more of a virtual computing environment, a hypervisor, a device emulation, or a virtual machine executing on one or more physical computing devices. The content server device(s) 110 are described further with reference to FIG. 4.

The content server device(s) 110 may execute a content service module 112. The content service module 112 may include any number of web servers, application servers, or other software modules that are configured to serve content items 108. In some cases, the content server device(s) 110 may cache one or more recently requested content items 108 in local storage on the content server device(s) 110, or in storage that is accessible to the content server device(s) 110. In such cases, if the requested content item(s) 108 are available in the cache, the content service module 112 may retrieve and serve the requested content item(s) 108 from the cache.

The content service module 112 may communicate the content item ID(s) 106 over one or more networks to one or more rule application devices 114. The rule application device(s) 114 may comprise any type of computing device, including but not limited to the types of computing devices described with reference to the user device(s) 102. In some cases, two or more of the rule application devices 114 may comprise a cluster, cloud, farm, or other grouping of multiple devices that coordinate operations to provide load balancing, failover support, parallel processing capabilities, shared storage resources, or other aspects. Although examples herein may describe the rule application device(s) 114 as physically separate devices, implementations are not so limited. In some cases, the rule application device(s) 114 may include one or more of a virtual computing environ-ment, a hypervisor, a device emulation, or a virtual machine executing on one or more physical computing devices. The rule application device(s) 114 are described further with reference to FIG. 5.

The content item ID(s) 106 may be received by a content item evaluation module 116 executing on the rule application device(s) 114. The content item evaluation module 116 may analyze the received content item ID(s) 106 and determine whether any rule(s) 118 are to be applied to any of the content item(s) 108 identified by the content item ID(s) 106. The content item evaluation module 116 may also access rule version data 120 listing a current version of each of the rule(s) 118 to be applied to the requested content item 108. In some cases, the content item evaluation module 116 may determine a type of the content item 108 requested and identify the rule(s) 118 to be applied to that type of content item 108. For example, a particular set of one or more rules 118 may be designated to be applied to a content item 108 if the content item 108 includes a description of a product offered through an online store. As another example, a particular set of one or more rules 118 may be designated to be applied to a content item 108 if the content item 108 is a public posting on a social network web site, or if the content item 108 is a search result produced by a search service. In some cases, all of the rules 118 may be applied to each content item 108 requested. In some cases, the rules 118 may be defined or provided by one or more individuals or organizations to implement particular policies regarding the presentation of the content item(s) 108 through a web site, application, or otherwise on the user device(s) 102.

The content item evaluation module 116 may access result data 122. As shown in FIG. 1, the result data 122 may be stored in local data storage on the rule application device(s) 114. Alternatively, the result data 122 may be stored externally to the rule application device(s) 114 in data storage that is accessible to the rule application device(s) 114 over one or more networks. The result data 122 may include the stored results of one or more previous applications of the rule(s) 118 to content items 108. The result data 122 is described further with reference to FIGS. 2 and 3. For each rule 118 to be applied to the content item 108 corresponding to the content item ID 106, the content item evaluation module 116 may search the result data 122 to determine whether the result data 122 includes a precomputed (e.g., previously computed) result of applying a version of the rule 118 to the content item 108.

In some implementations, one or more of the rule(s) 118 may be updated to apply a new policy governing content presentation or for other reasons. Accordingly, there may be multiple versions of a rule 118, including a current (e.g., latest, most recently updated) version of the rule 118 and zero or more previous versions of the rule 118. For each pairing of a content item 108 and a rule 118 that is applicable to the content item 108, the result data 122 may store a current result that is the result of applying the current version of the rule 118 to the content item 108. For each pairing of a content item 108 and a rule 118 applicable to the content item 108, the result data 122 may also store one or more previous results, each previous result being the result of applying a previous version of the rule 118 to the content item 108. The current version(s) of each of the rule(s) 118 may be described in the rule version data 120, which may list for each rule 118 a version ID denoting the current version of the rule 118.

For each of the rule(s) 118 to be applied to the requested content item 108, the content item evaluation module 116 may determine whether the result data 122 stores a result of applying a current version of the rule 118 to the content item 108. If the result data 122 includes a precomputed result of applying a current version of the rule 118 to the content item 108, this current result may be retrieved and employed by modules executing on the content server device(s) 110 to determine whether the content item 108 is to be delivered for presentation on the user device 102. In some implementations, the result data 122 may identify the version of the rule 118 used to generate each of the results in the result data 122. The content item evaluation module 116 may compare the rule version included in the result data 122 to the rule version data 120 listing the current version of one or more rules 118. If the two versions are substantially the same or otherwise correspond, the content item evaluation module 116 may determine that the result data 122 includes a current result of applying a current version of the rule 118 to the content item 108.

In some cases, the result data 122 may include a previous result of applying a previous version of the rule 118 to the content item 108. In such cases, the previous result may be retrieved from the result data 122 and employed by modules executing on the content server device(s) 110 to determine whether the content item 108 is to be delivered for presentation on the user device 102. In cases where the rule 118 is substantially static, e.g., such that it changes incrementally from version to version, the previous result may provide an approximation of a current result when a current result is not present in the result data 122. In cases where the result data 122 does not include a current result or a previous result of applying a current version or a previous version of the rule 118 to the content item 108, a default result may be employed in determining whether to deliver the content item 108. In some implementations, the default result may be a Boolean true value, e.g., indicating that the content item 108 is to be delivered for presentation on the user device 102.

If the result data 122 does not store a current result of applying the rule 118, such that a previous result or a default result is employed, the content item evaluation module 116 may add a job to a job queue 124. The job queue 124 may include a listing of one or more jobs that are each executable to compute a current result of applying a current version of a rule 118 to a content item 108. Adding the job to the job queue 124 may include queuing the job by placing it at the top of the job queue 124, the bottom of the job queue 124, or into any other location in the job queue 124. The jobs in the job queue 124 may be executed by a results computation module 126 executing on the rule application device(s) 114. The results of executing the jobs may be added to the result data 122.

In some implementations, the jobs in the job queue 124 may be executed asynchronously with the receipt of the content item request(s) 104, such that each of the jobs executes at a time that is independent of the time(s) when the content item request(s) 104 are received and processed. In some implementations, the timing of the execution of the jobs may depend on resource availability on the rule application device(s) 114, e.g., the jobs may execute when processor usage for other processes is below a predetermined threshold usage. Alternatively, the jobs in the job queue 124 may be executed at a scheduled day and time. In some cases, the jobs in the job queue 124 may be executed at a predetermined frequency, e.g., nightly, hourly, and so forth. Although FIG. 1 depicts the results computation module 126 as executing on a same set of rule application device(s) 114 as the content item evaluation module 116, in some implementations the results computation module 126 may execute on separate computing device(s) relative to the content item evaluation module 116. The processing of the jobs in the job queue 124 is described further with reference to FIG. 9.

As shown in FIG. 1, the rule application device(s) 114 and the content server device(s) 110 may access one or more content storage system(s) 128 that store the content item(s) 108. The content storage system(s) 128 may provide data storage on any number of databases, datastores, or other data storage devices. The data storage may comprise any number of tables, arrays, structured lists, trees, or other data structures. The content storage system(s) 128 may provide data storage in any relational or non-relational data storage format. Although the content storage system(s) 128 are depicted as external to the rule application device(s) 114 and the content server device(s) 110, implementations are not so limited. In some implementations, the content storage system(s) 128 may be at least partly incorporated into one or both of the rule application device(s) 114 or the content server device(s) 110.

In some implementations, the results computation module 126 may be configured to modify or remove a content item 108 in the content storage system(s) 128 based on the results of applying one or more of the rule(s) 118 to the content item 108. For example, if the results computation module 126 computes a result of applying a rule 118 to a content item 108, and the result indicates that the content item 108 is not to be presented on the user device(s) 102, then the results computation module 126 may remove the content item 108 from the content storage system(s) 128. Alternatively, the results computation module 126 may modify the stored content item 108 to indicate that the content item 108 may not be presented, e.g., by adding a flag or other data to the record for the content item 108 in the content storage system(s) 128. In some implementations, the result data 122 may be accessed by a content aggregation module 130 executing on the content server device(s) 110. The content aggregation module 130 may be configured to collect information from any number of source devices, processes, or databases regarding content items 108 that are presentable on user devices 102. For example, the content aggregation module 130 may be configured to access the content storage system(s) 128 and retrieve the content item(s) 108 stored therein. The content aggregation module 130 may correlate, interpret, or transform the information to prepare pages (e.g., web pages) that include the content item(s) 108 and that are presentable (e.g., through a web browser) on the user device(s) 102. In some cases, the content aggregation module 130 may transform information regarding the content item(s) 108 into a summarized (e.g., abstracted) format that may be more efficiently communicated to other devices compared to the raw data of the content item(s) 108. In some implementations, the content aggregation module 130 may employ the results stored in the result data 122 to determine which content item(s) 108 may be aggregated or otherwise processed to be delivered to the user device(s) 102 for presentation. If the result data 122 includes a result that indicates a content item ID 106 is not to be presented, the content aggregation module 130 may not provide the corresponding content item 108 for presentation on the user device(s) 102.

In some implementations, the result data 122 may be accessed by a search module 132 executing on the content server device(s) 110. The search module 132 may be configured to generate search results in response to a search query received from a user device 102, where such search results may include one or more content items 108. In some implementations, the search module 132 may omit a content item 108 from a list of provided search results if the result data 122 includes a result indicating that the content item is not to be presented.

Based on the result data 122, one or both of the content aggregation module 130 or the search module 132 may provide one or more content items 108 to the content service module 112. The content service module 112 may then serve the content item(s) 108 to the user device(s) 102 in response to the content item request(s) 104. The delivery of content item(s) 108 based on the results of applying the rule(s) 118 is described further with reference to FIGS. 6-8. In some implementations, the result data 122 may be employed to determine whether a content item 108 is to be provided to a user device 102 in response to a content item request 104. Such implementations are described further with reference to FIG. 7. In some implementations, the result data 122 may be employed to determine, adjust, or modify the presentation of the content item 108 in response to the content item request 104. Such implementations are described further with reference to FIG. 8.

In some implementations, a content item 108 may be provided in response to a content item request 104, and that content item request 104 may trigger the analysis to determine whether the content item 108 complies with one or more rules 118. The result data 122 resulting from the application of the rule(s) 118 may then be employed to determine whether the content item 108 is to be provided in response to subsequent content item requests 104. In some cases, the result data 122 may be employed to determine whether the content item 108 is to be subsequently listed in a catalog of content items 108 (e.g., a product catalog) that is assembled by the content aggregation module 130 for presentation to a user. The result data 122 may also be employed to determine whether the content item 108 is to be subsequently included in search results generated by the search module 132 for presentation to a user. Accordingly, although the content item 108 may be presented in response to the first content item request 104 for that content item 108, the results of applying the rule(s) 118 may be employed to determine whether the content item 108 is to be subsequently published, exposed, or otherwise presented to users. In some implementations, a result of applying a rule 118 to a content item 108 may persist in the result data 122 without expiration until an updated version of the rule 118 prompts a re-computation of the result for the content item 108.

In some implementations, if the current result, previous result, or default result is a Boolean false value, e.g., indicating that the content item 108 is not to be delivered for presentation on the user device 102, then the content item evaluation module 116 may add the content item ID 106 to a blacklist. The blacklist may include zero or more content item IDs 106 to indicate those content items 108 to be blocked from presentation on user devices 102. Alternatively, some implementations may employ a whitelist instead of the blacklist. The whitelist may list those content items 108 that may be presented on user devices 102, and the whitelist may indicate the blocked content items 108 based on their omission from the whitelist. Implementations support the use of any number or any combination of whitelists and blacklists to indicate those content items 108 that may or may not be presented on user devices 102. In some implementations, the content item ID(s) 106 may persist in the blacklist without expiration until an updated version of the rule(s) 118 prompts a re-evaluation of the results for the content item(s) 108. The blacklist(s) or whitelist(s) may be employed by one or both of the content aggregation module 130 or the search module 132 to determine whether to present the content item(s) 108.

Implementations may enable an expedited response to changes in externally imposed (e.g., government) regulations or to changes in internal business policies regarding the presentation of content items 108. In response to such changes, one or more of the rules 118 may be updated to prevent, allow, or modify the presentation of the content item(s) 108 in view of the changed regulations or polices. As the content item(s) 108 are requested, the updated versions of the rule(s) 118 may be applied to update the result data 122. The result data 122 may then be employed to determine which content item(s) 108 may be presented or to determine a manner of presenting the content item(s) 108.

In some implementations, the receipt of a content item request 104 for a content item 108 may trigger the accessing of the result data 122 to determine the presentation of the content item 108. Accessing the result data 122 and determining the presentation of the content item 108 may be performed substantially synchronously with the content item request 104. In cases where the result data 122 does not already include the precomputed result(s) of applying current version(s) of the rule(s) 118 to the requested content item 108, one or more jobs may be added to the job queue 124 to compute the result(s) asynchronously relative to the content item request 104. Accordingly, implementations support the computation of result(s) for those content item(s) 108 that are requested for presentation.

Implementations also support the application of the rule(s) 118 to compute result(s) based on other types of events. In some implementations, the application of one or more rules 118 to a content item 108 may be substantially synchronous with receiving the content item 108 to be stored in the content storage system(s) 128. In some cases, the content item(s) 108 may be received from end users, merchants whose web sites are served through the content server device(s) 110, or other third party content providers. In such cases, implementations enable the rule(s) 118 to be applied to the content item 108 when the content item 108 is ingested into the system, e.g., received to be stored in the content storage system(s) 128. If the result(s) of applying the rule(s) 118 indicate that the content item 108 is not to be presented on the user device(s) 102, the content item 108 may not be stored in the content storage system(s) 128. Alternatively, if the result(s) indicate that the content item 108 is not to be presented, the content item 108 may be stored but with a flag or other information indicating that it is not to be presented to users. In some cases, the rule(s) 118 applied during ingestion of the content item(s) 108 may be different than the rule(s) 118 applied in the jobs that are added to the job queue 124 based on the content item request(s) 104.

In some implementations, the rule(s) 118 may be applied to one or more of the content items 108 stored in the content storage system(s) 128 independently of the content item request(s) 104 for the content item(s) 108. For example, a process may execute one or more times as a scheduled process, or in response to an operator request, to apply the rule(s) 118 to stored content item(s) 108. The result data 122 generated based on the application of the rule(s) 118 may then be subsequently used to determine whether to present the content item(s) 108 in response to the content item request(s) 104. Alternatively, the generated result data 122 may be employed to determine which of the content item(s) 108, if any, are to be removed from the content storage system(s) 128 or flagged for non-presentation. In some implementations, the rule(s) 118 applied during such a process (e.g., a static or background process) may be different than the rule(s) 118 applied (e.g., dynamically) in the jobs that are added to the job queue 124 based on the content item request(s) 104. Moreover, in some implementations the rule(s) 118 applied to the content item(s) 108 may differ based on characteristics of the content item request 104. For example, the applied rule(s) 118 may be based at least partly on one or more of the following: a geographic origin of the content item request 104 that prompted the application of the rule(s) 118; a type of the user device 102 that sent the content item request 104 (e.g., whether the user device 102 is a mobile device or otherwise); information regarding the user that generated the content item request 104 (e.g., age of the user, the user's language preference, and so forth); or other characteristics of the content item request 104.

Although some examples herein describe implementations in which the precomputed results of applying the rule(s) 118 may be employed to determine whether one or more particular content items 108 are to be delivered for presentation on user device(s) 102, implementations are not so limited. In some implementations, one or more rules 118 may be applied asynchronously to other types of data item(s) to generate stored result data 122. A stored result may then be accessed and provided in response to a request for the result of applying a rule 118 to an input data item, instead of computing the result in real time (e.g., dynamically) in response to the request. In this way, implementations enable the result(s) to be provided more efficiently and may thus mitigate the delay that may be caused by re-computing a result substantially in real time. Such implementations are described further with reference to FIG. 10.

In some cases, it may be desirable to expedite the evaluation of a function y=f(x) based on an input data item x, and the computational cost of evaluating f(x) may be sufficiently high such that it may be disadvantageous to compute f(x) substantially in real time in response to a request for y given a large dataset to be accessed to evaluate y. Moreover, in some cases the definition of f(x) may be slowly changing from version to version, and there may exist a default result for f(x) (e.g., a Boolean true result) that is usable, in many cases, by the process requesting y. In such cases, the implementations described herein may enable a usable result y to be provided substantially in real time while the potentially more accurate result y is computed in the background or otherwise asynchronously with respect to the request for y.

The computation of the results of evaluating the rule(s) 118 with respect to content item(s) 108 may be triggered in response to the content item request(s) 104 for the particularly requested content item(s) 108, and the results may be stored for those particularly requested content item(s) 108. Accordingly, implementations may be described as providing a lazy evaluation and storage of those results that are requested. The combination of such a lazy evaluation technique and the lookup of the stored results may enable implementations to provide results efficiently in response to requests, and the results may be sufficiently accurate in cases where the rule(s) 118 change incrementally (e.g., slowly) from version to version.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environment 100 may be encrypted or otherwise secured. For example, such communications may employ one or more public or private cryptographic keys, ciphers, digital certificates, or other credentials supported by a security protocol such as any version of the Secure Sockets Layer (SSL) or the Transport Layer Security (TLS) protocol.

Figure 2:
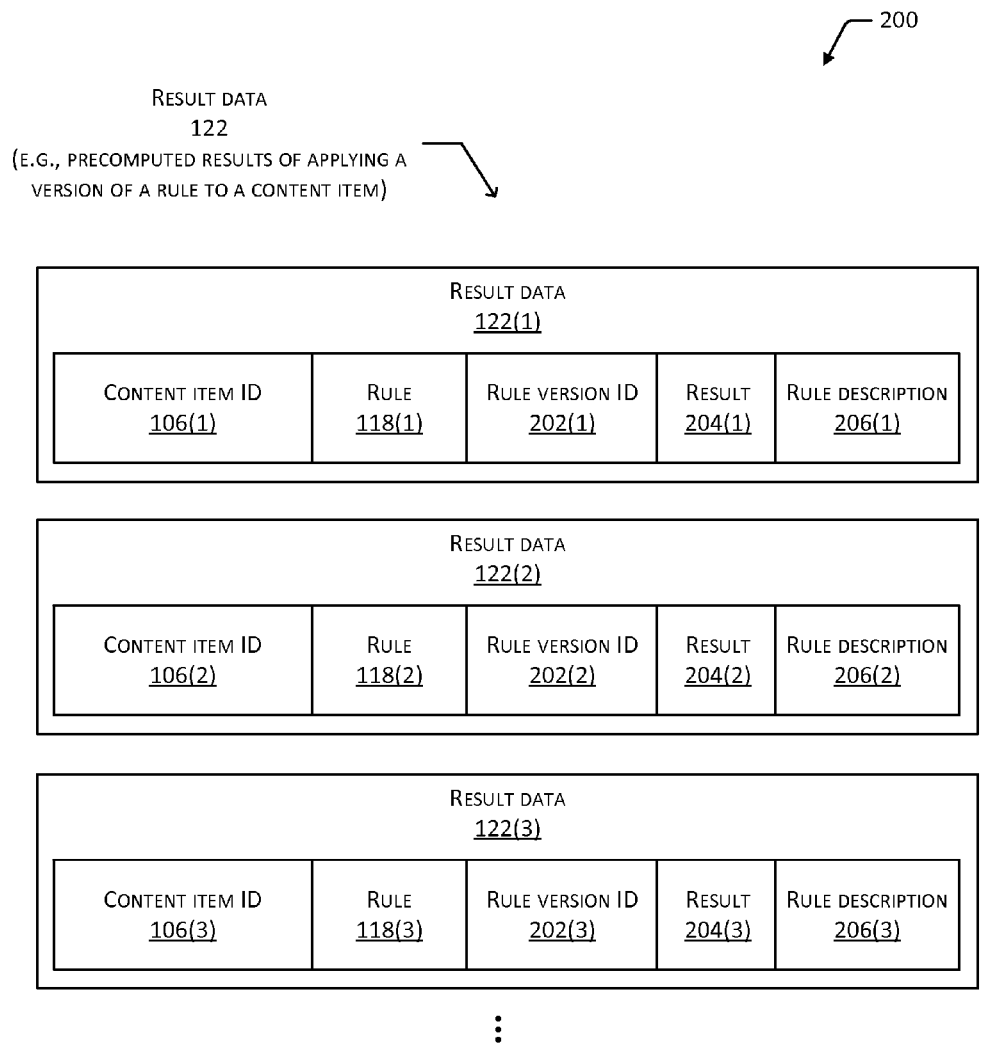
FIG. 2 depicts a schematic illustrating an example format for stored result data including result(s) of previous applications of rule(s) to content items or other types of input data.

FIG. 2 depicts a schematic 200 illustrating an example format for the result data 122, including the result(s) of previous applications of the rule(s) 118 to the content item(s) 108 or to other types of input data items. As shown in FIG. 2, the result data 122 may include any number of records (e.g., rows). Each record may include the content item ID 106 identifying the content item 108 to which a rule 118 was applied. Each record may also include a rule version ID 202 describing a version of the rule 118 applied to the content item 108. The rule version ID 202 may be numeric (e.g., version 1, version 2.1, etc.). The rule version ID 202 may also include a timestamp, such as a date and time when the applied version of the rule 118 was created or otherwise became available. Each record of the result data 122 may include the result 204 of applying the version of the rule 118 specified by the rule version ID 202 to the content item 108 identified by the content item ID 106. In some implementations, each record of the result data 122 may also include a rule description 206 that describes the rule 118 applied. In some implementations, the rule 118 may be a machine readable portion of script or code that is executable to apply the rule 118 to a content item 108. In some cases, the result data 122 may include a rule ID that may be employed as a key to retrieve the rule 118 from a separate table that stores the rule(s) 118.

Figure 3:
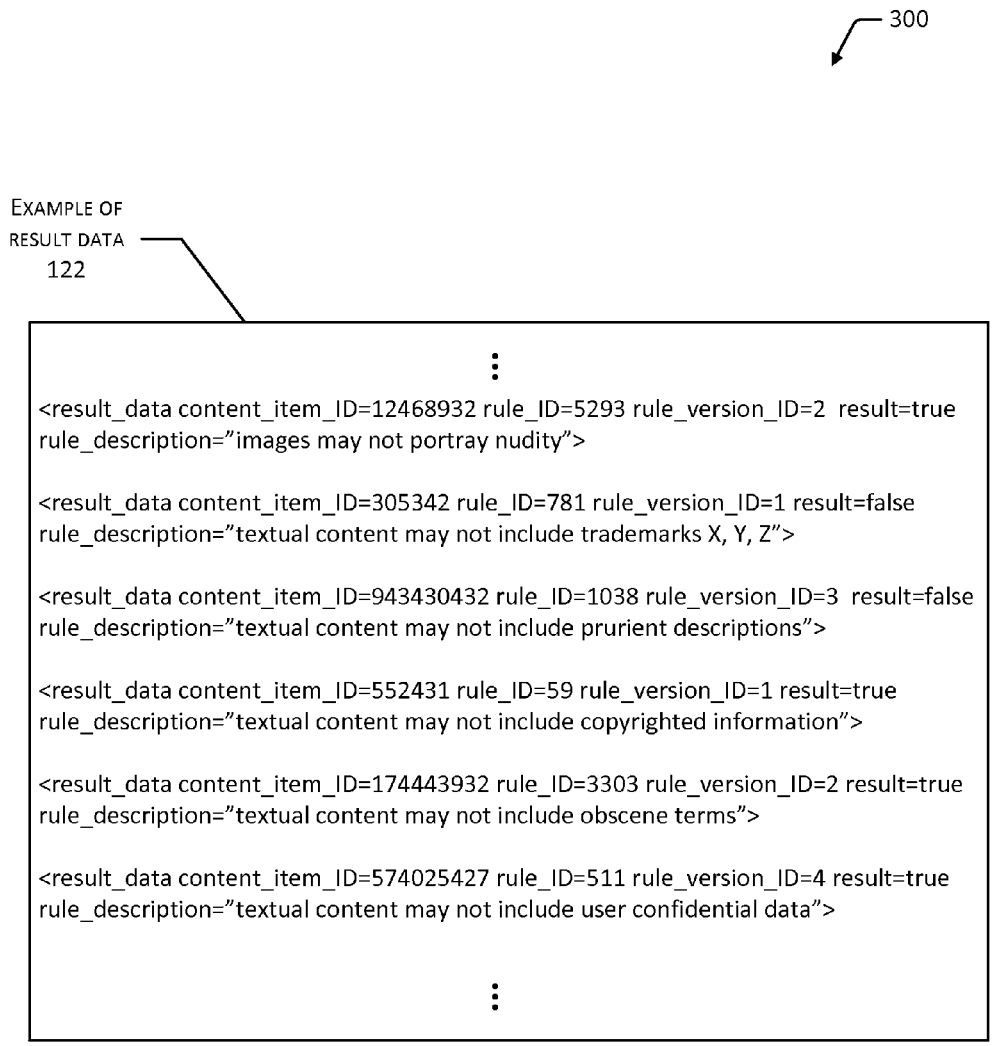
FIG. 3 depicts a schematic illustrating an example of result data including result(s) of previous applications of rule(s).

FIG. 3 depicts a schematic 300 illustrating an example of the result data 122 including the result(s) 204 of previous applications of the rule(s) 118. As shown in the example of FIG. 3, the result data 122 may include any number of records, rows, or data elements that each correspond to a result 204 of applying a rule 118 to a content item 108, or to some other type of input data item. Although the example of FIG. 3 depicts the result data 122 described using a markup language such as a version of the Extensible Markup Language (XML), implementations are not so limited. Implementations support the use of any format to describe the result data 122, including formats that employ or do not employ metadata tags to identify particular data elements. In the example of FIG. 3, each record of result data 122 is described in a tag, and the content item ID 106, the rule 118, the rule version ID 202, the result 204, and the rule description 206 are each included as attributes in the tag. For example, as shown in FIG. 3, each of these attributes may be respectively indicated by tags "content_item_ID", "rule_ID", rule_version", "rule_description", and "result". Alternatively, one or more of the attributes may be included in the result data 122 as a separate tag between open and close tags such as an <result_data> tag and a </result_data> tag.

Although FIG. 3 depicts particular example formats and data for the content item ID 106, rule 118, rule version ID 202, result 204, and rule description 206, implementations are not limited to these examples. Moreover, implementations are not limited by the example order and format of the result data 122 shown in FIG. 3. Further, although examples herein describe the results 204 as Boolean true or false values, indicating that a content item 108 may be presented or may not be presented, implementations also support the use of other data types for the results 204. For example, implementations may support the employment of rules 118 that are configured to classify one or more content items 108 into a category, class, sub-class, product type, brand, seller, price, or other characteristic. In such cases, the result(s) 204 may be numeric data, text strings, character data, and so forth.

Although FIGS. 2 and 3 depict examples in which a particular set of data attributes are included in a record corresponding to a result 204, implementations are not limited to these examples. In some implementations, the rule description 206 may be stored in a separate table from the result data 122. In such cases, a rule ID may be employed as a secondary key to access the separate table and to retrieve the rule description 206 for a particular rule 118.

Figure 4:
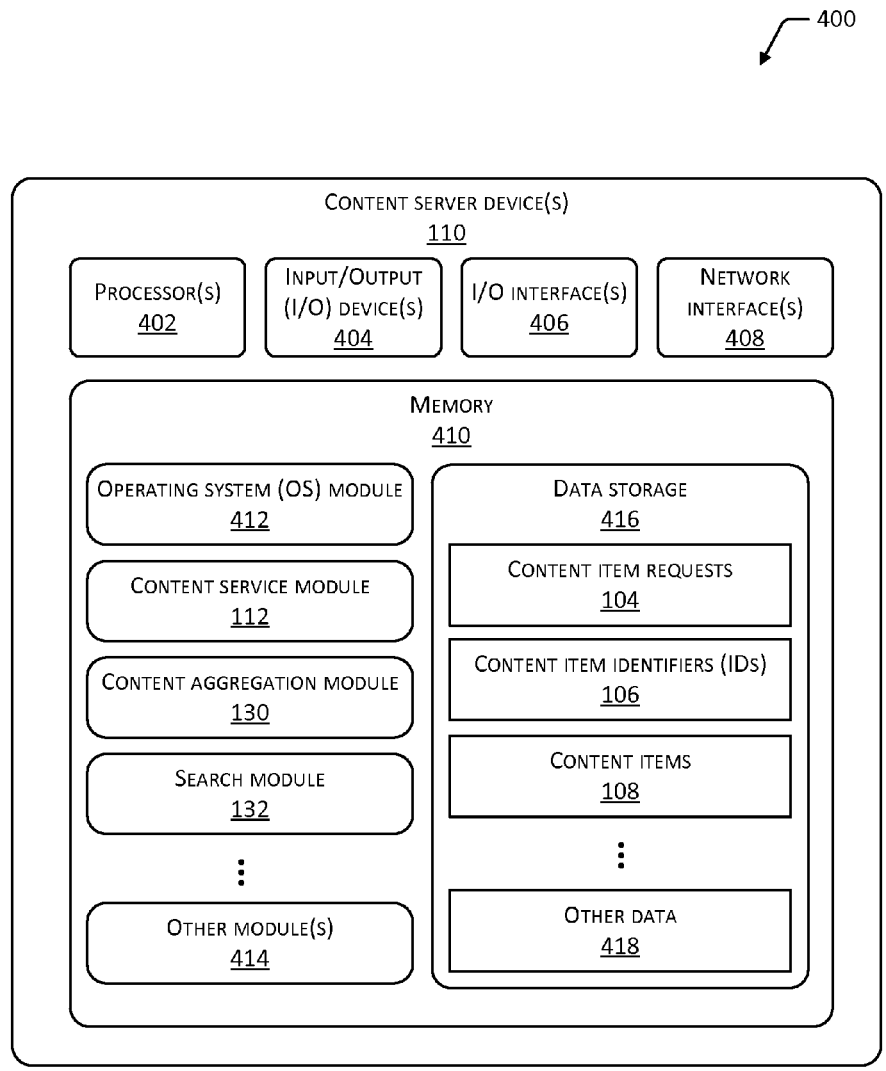
FIG. 4 depicts a block diagram of example content server device(s) configured to serve content items in response to content item requests.

FIG. 4 depicts a block diagram 400 of an example of the content server device(s) 110. As shown in the block diagram 400, the content server device(s) 110 may include one or more processors 402 (e.g., hardware-based processor(s)) configured to execute one or more stored instructions. The processor(s) 402 may comprise one or more cores.

The content server device(s) 110 may include one or more input/output (I/O) devices 404. The I/O device(s) 404 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 404 may also include output devices such as a display, an audio output device (e.g., a speaker), a printer, a haptic output device, and so forth. The I/O device(s) 404 may be physically incorporated with the content server device(s) 110, or may be externally placed.

The content server device(s) 110 may include one or more I/O interfaces 406 to enable components or modules of the content server device(s) 110 to control, interface with, or otherwise communicate with the I/O device(s) 404. The I/O interface(s) 406 may enable information to be transferred in or out of the content server device(s) 110, or between components of the content server device(s) 110, through serial communication, parallel communication, or other types of communication. For example, the I/O interface(s) 406 may comply with a version of the RS-232 standard for serial ports, or with a version of the Institute of Electrical and Electronics Engineers (IEEE) 1284 standard for parallel ports. As another example, the I/O interface(s) 406 may be configured to provide a connection over Universal Serial Bus (USB) or Ethernet. In some cases, the I/O interface(s) 406 may be configured to provide a serial connection that is compliant with a version of the IEEE 1394 standard. The content server device(s) 110 may also include one or more busses or other internal communications hardware or software that allow for the transfer of data between the various modules and components of the content server device(s) 110.

The content server device(s) 110 may include one or more network interfaces 408 that enable communications between the content server device(s) 110 and other network accessible computing devices, such as the user device(s) 102 or the rule application device(s) 114. The network interface(s) 408 may include one or more network interface controllers (NICs) or other types of transceiver devices configured to send and receive communications over a network.

The content server device(s) 110 may include one or more memories, described herein as memory 410. The memory 410 comprises one or more computer-readable storage media (CRSM). The CRSM may include one or more of an electronic storage medium, a magnetic storage medium, an optical storage medium, a quantum storage medium, a mechanical computer storage medium, and so forth. The memory 410 provides storage of computer-readable instructions that may describe data structures, program modules, processes, applications, or other data for the operation of the content server device(s) 110. In some implementations, the memory 410 may provide storage of computer-readable instructions or other information in a non-transitory format.

The memory 410 may include an operating system (OS) module 412. The OS module 412 may be configured to manage hardware resources such as the I/O device(s) 404, the I/O interface(s) 406, and the network interface(s) 408, and to provide various services to applications, processes, or modules executing on the processor(s) 402. The OS module 412 may include one or more of the following: any version of the Linux™ operating system; any version of iOS from Apple™ Corp. of Cupertino, Calif., USA; any version of Windows™ or Windows Mobile™ from Microsoft™ Corp. of Redmond, Wash., USA; any version of Android™ from Google™ Corp. of Mountain View, Calif., USA and its derivatives from various sources; any version of Palm OS™ from Palm Computing™, Inc. of Sunnyvale, Calif., USA and its derivatives from various sources; any version of BlackBerry OS™ from Research In Motion™ Ltd. of Waterloo, Ontario, Canada; any version of VxWorks™ from Wind River Systems™ of Alameda, Calif., USA; or other operating systems.

The memory 410 may include one or more of the modules described above as executing on the content server device(s) 110, such as one or more of the content service module 112, the content aggregation module 130, or the search module 132. The memory 410 may also include one or more other modules 414, such as a user authentication module or an access control module to secure access to the content server device(s) 110, and so forth.

The memory 410 may include data storage 416 to store data for operations of the content server device(s) 110. The data storage 416 may comprise a database, array, structured list, tree, or other data structure, and may be a relational or a non-relational datastore. The data storage 416 may store data such as that described above, including one or more of the content item request(s) 104, the content item ID(s) 106, or the content item(s) 108. The data storage 416 may also store other data 418, such as user authentication information or access control data. In some implementations, at least a portion of the information stored in the data storage 416 may be stored externally to the content server device(s) 110, on other devices that may communicate with the content server device(s) 110 via the I/O interface(s) 406 or via the network interface(s) 408.

Figure 5:
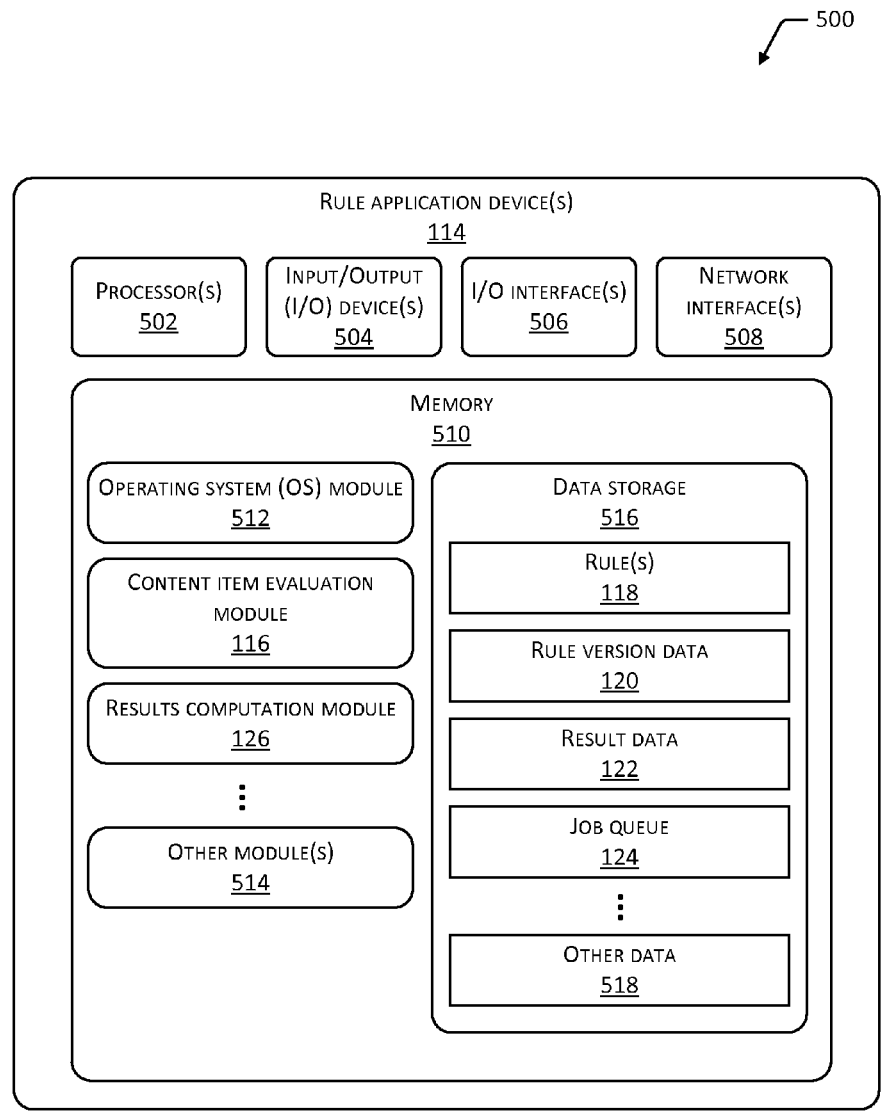
FIG. 5 depicts a block diagram of example rule application device(s) configured to apply rule(s) for determining whether content item(s) are to be presented, and to store the result(s) of applying the rule(s).

FIG. 5 depicts a block diagram 500 of an example of the rule application device(s) 114. As shown in the block diagram 500, the rule application device(s) 114 may include one or more processors 502 (e.g., hardware-based processor(s)) configured to execute one or more stored instructions. The processor(s) 502 may comprise one or more cores. The rule application device(s) 114 may include one or more I/O devices 504, one or more I/O interfaces 506, and one or more network interfaces 508 as described above respectively with reference to the I/O device(s) 404, the I/O interface(s) 406, and the network interface(s) 408.

The rule application device(s) 114 may include one or more memories, described herein as memory 510. The memory 510 comprises one or more CRSM, as described above with reference to the memory 410. The memory 510 may include an OS module 512 that is configured to manage hardware resources such as the I/O device(s) 504, the I/O interface(s) 506, and the network interface(s) 508, and to provide various services to applications, processes, or modules executing on the processor(s) 502. The OS module 512 may include one or more of the operating systems described above with reference to the OS module 412. The memory 510 may include one or more of the modules described above as executing on the rule application device(s) 114, such as the content item evaluation module 116 and the results computation module 126. The memory 510 may also include one or more other modules 514, such as a user authentication module or an access control module to secure access to the rule application device(s) 114, and so forth.

The memory 510 may include data storage 516, which may store data for operations of the rule application device(s) 114. The data storage 516 may comprise a database, array, structured list, tree, or other data structure, and may be a relational or a non-relational datastore. The data storage 516 may include data that is in active memory on the rule application device(s) 114, or data that is written to a hard drive, disk, or other non-volatile storage on the rule application device(s) 114. The data storage 516 may store data such as that described above, including one or more of the rule(s) 118, the result data 122, or the job queue 124. In implementations that employ blacklist(s) or whitelist(s) to determine whether to present content item(s) 108, the data storage 516 may also store such blacklist(s) or whitelist(s).

In some implementations, the data storage 516 may also store the rule version data 120. The rule version data 120 may list the current rule version ID 202 for one or more rules 118. The rule version data 120 may be employed by the content item evaluation module 116 to determine whether the result data 122 includes a current result of applying a current version of a rule 118 to a content item 108, a previous result of applying a previous version of a rule 118 to a content item 108, or no result of applying any version of a rule 118. The data storage 516 may also store other data 518, such as user authentication information or access control data. In some implementations, at least a portion of the information stored in the data storage 516 may be stored externally to the rule application device(s) 114, on other devices that may communicate with the rule application device(s) 114 via the I/O interface(s) 506 or via the network interface(s) 508.

Figure 6:
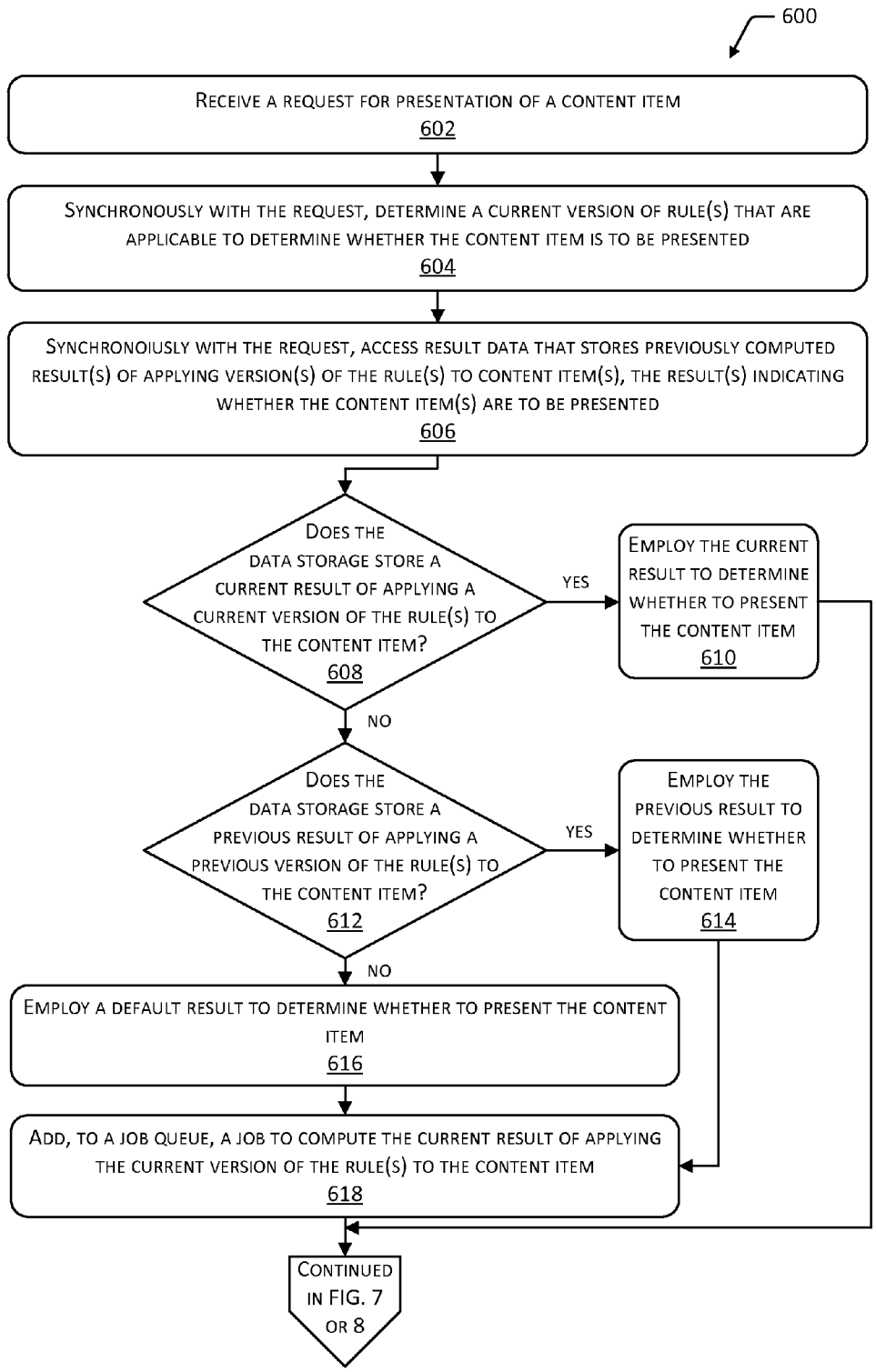
FIG. 6 depicts a flow diagram of a process for retrieving a stored result in response to a request for a content item, if an appropriate stored result is available, and in some cases queuing a job to compute a current result if the current result is not stored.

FIG. 6 depicts a flow diagram 600 of a process for retrieving a stored result 204 in response to the content item request 104 for the content item 108, if an appropriate stored result 204 is available in the result data 122, and in some cases queuing a job to compute a current result if the current result is not stored. One or more operations of the process may be performed by the content service module 112, the content aggregation module 130, the search module 132, other modules executing on the content server device(s) 110, the content item evaluation module 116, the results computation module 126, other modules executing on the rule application device(s) 114, or modules executing on other devices.

At 602, a content item request 104 is received or an indication of a content item request 104 is received. The content item request 104 may include the content item ID 106, and may request that the content item 108 corresponding to the content item ID 106 be delivered for presentation on the user device 102 that sent the content item request 104.

At 604, one or more rules 118 may be identified that are applicable to determine whether the requested content item 108 is to be delivered for presentation on the user device 102, and a current version of each of the rule(s) 118 may be determined based on the rule version data 120. In some implementations, the identification of the rule(s) 118 and the determination of the current version(s) may be performed synchronously with the content item request 104.

At 606, the result data 122 may be accessed from the data storage 516. As described above, the result data 122 may store precomputed (e.g., previously computed) results 204 of applying the rule(s) 118 to content items 108 and each of the results 204 may indicate whether a corresponding content item 108 may be presented on the user device(s) 102. In some implementations, the access to the result data 122 may be performed synchronously with receiving the content item request 104. Moreover, in some cases one or more of the subsequent operations 608, 610, 612, 614, 616, or 618 may also be performed synchronously relative to receiving the content item request 104.

At 608, a determination is made whether the result data 122 stores a current result of applying a current version of the rule(s) 118 to the requested content item 108. If so, the process may proceed to 610 and employ the current result to determine whether to present the content item 108. After 610, the process may proceed as described with reference to FIG. 7 or 8 below. If the result data 122 does not store a current result, the process may proceed to 612.

At 612, a determination is made whether the result data 122 stores a previous result of applying a previous version of the rule(s) 118 to the requested content item 108. If so, the process may proceed to 614 and employ the previous result to determine whether to present the content item 108. After 614, the process may proceed to 618. If the result data 122 does not store a previous result, the process may proceed to 616. As described above, in some implementations the determination of whether the result data 122 includes a current result or a previous result may be made by comparing the rule version ID 202 listed in the rule version data 120 (e.g., the current version of the rule 118) to the rule version ID 202 listed in the portion of the result data 122 corresponding to each of the rule(s) 118 applied to the requested content item 108.

At 616, if the result data 122 does not include a current result or a previous result of applying the rule(s) 118 to the content item 108, a default result may be employed to determine whether to present the content item 108. In some cases, the default result may be a Boolean true value, indicating that the content item 108 may be delivered for presentation on the user device 102.

At 618, one or more jobs may be added to the job queue 124. Each job may be executable to compute the current result of applying the current version of one of the rule(s) 118 to the content item 108. As described further with reference to FIG. 9, the jobs in the job queue 124 may be executed asynchronously with the content item request 104, at a time that is independent of the time when the content item request 104 is received. The process may then proceed as described with reference to either FIG. 7 or FIG. 8.

Figure 7:
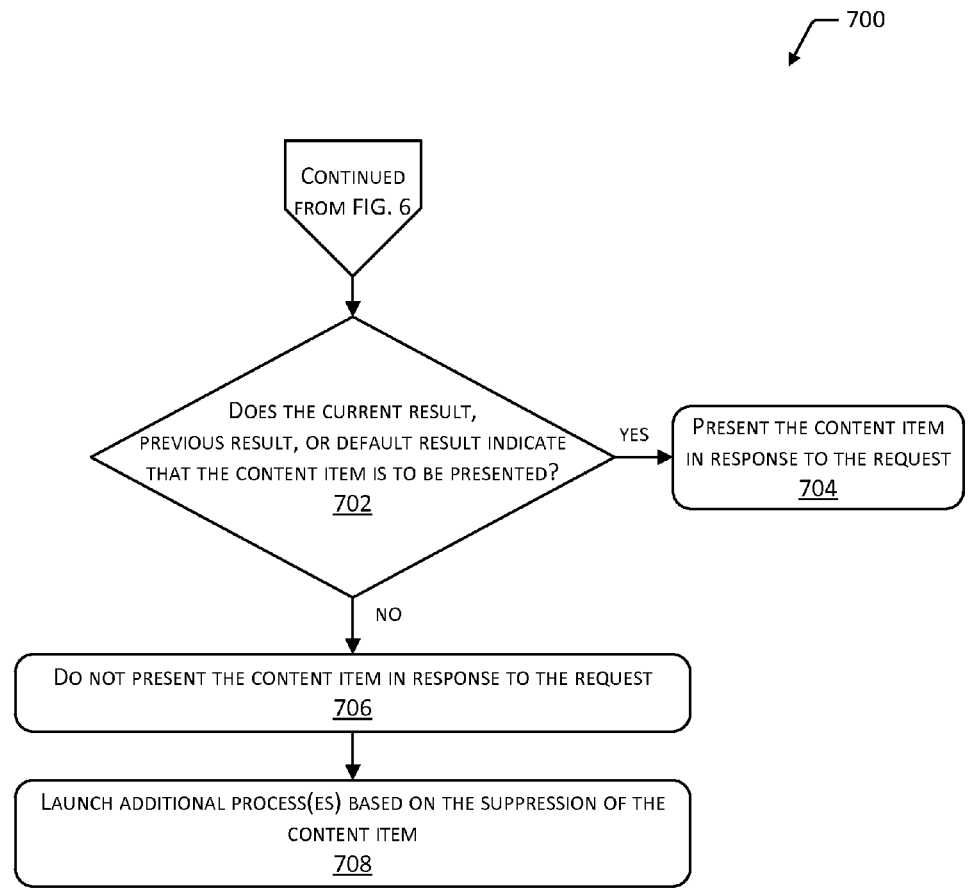
FIG. 7 depicts a flow diagram of a process for employing the retrieved result to determine whether to present a requested content item.

FIG. 7 depicts a flow diagram 700 of a process for employing the retrieved result 204 to determine whether to present the requested content item 108 in response to a received content item request 104. One or more operations of the process may be performed by the content service module 112, the content aggregation module 130, the search module 132, other modules executing on the content server device(s) 110, the content item evaluation module 116, the results computation module 126, other modules executing on the rule application device(s) 114, or modules executing on other devices.

At 702, a determination is made whether the current result retrieved at 610, the previous result retrieved at 614, or the default result determined at 616 indicates that the content item 108 is to be delivered for presentation on the user device 102 that sent the content item request 104. If so, at 704 the content item 108 may be provided to the user device 102 in response to the content item request 104. If not, at 706 the content item 108 may not be provided in response to the content item request 104. In implementations that employ a blacklist as described above, at 706 a content item 108 that was previously added to the blacklist may be removed from the blacklist if the current result, previous result, or default result indicates that the content item 108 may be presented. In implementations that employ a whitelist as described above, at 706 a content item 108 that was previously omitted from the whitelist may be added to the whitelist if the current result, previous result, or default result indicates that the content item 108 may be presented.

At 708, in some implementations one or more additional processes or workflows may be launched based on the non-presentation of the content item 108. For example, a process may be started to remove the content item 108 from any caches or other locations in memory. In some cases at 708, a process may be started to examine clickstream data to generate a report that includes metrics or other information regarding the content item request 104 for the content item 108, such as the number, frequency, or origin of requests received for the content item 108.

FIG. 7 depicts implementations in which the stored results 204 may be employed to determine whether to provide the content item 108 in response to a content item request 104 for the content item 108. In some implementations, the content item 108 may be provided for presentation in response to the initial content item request 104 for the content item 108, and subsequent presentations of the content item 108 may be allowed or disallowed based on the result(s) 204 of applying rule(s) 118 to the content item 108 through asynchronously executing (e.g., background or batch) jobs to compute the result(s) 204.

Figure 8:
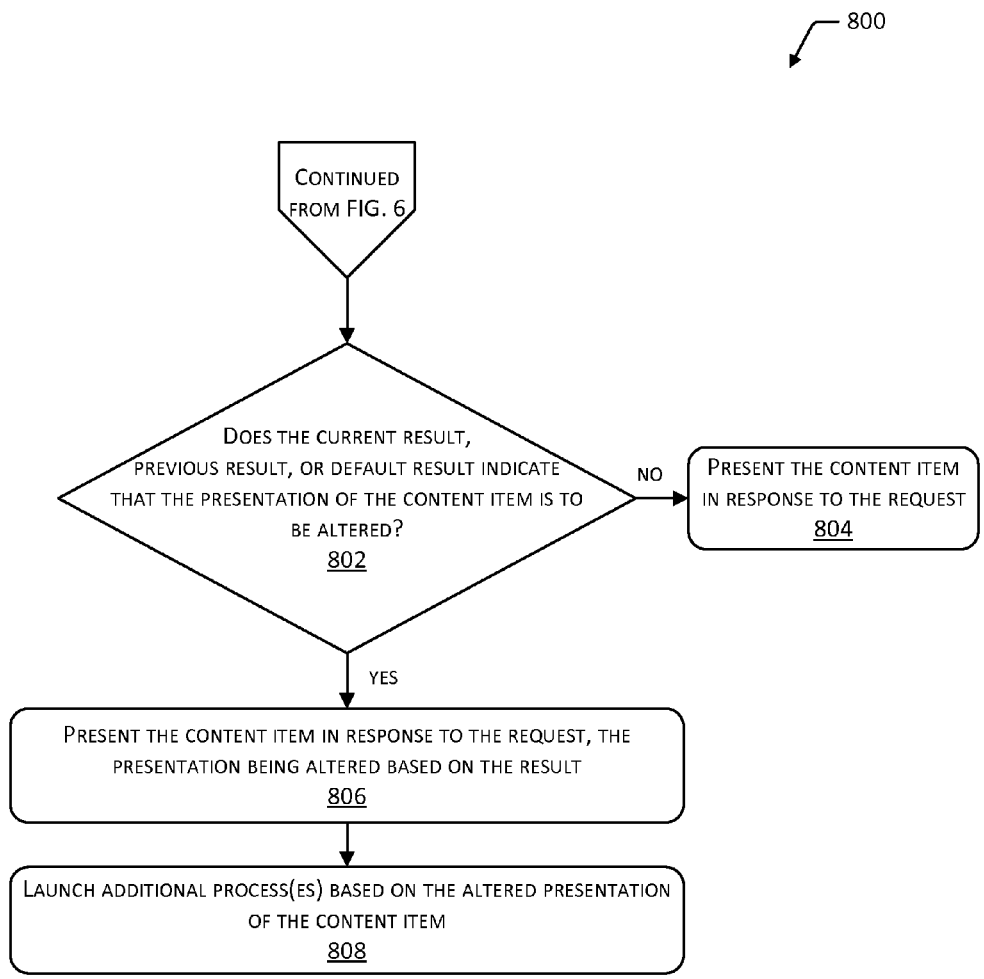
FIG. 8 depicts a flow diagram of a process for employing the retrieved result to determine a manner for presenting the requested content item.

FIG. 8 depicts a flow diagram 800 of a process for employing the retrieved result 204 to determine a manner for presenting the requested content item 108. One or more operations of the process may be performed by the content service module 112, the content aggregation module 130, the search module 132, other modules executing on the content server device(s) 110, the content item evaluation module 116, the results computation module 126, other modules executing on the rule application device(s) 114, or modules executing on other devices.

At 802, a determination is made whether the current result retrieved at 610, the previous result retrieved at 614, or the default result determined at 616 indicates that the presentation of the content item 108 is to be altered.

If it is determined at 802 that the presentation of the content item 108 is not to be altered, the process may process may proceed to 804. At 804, the content item ID 106 corresponding to the content item 108 may be provided for presentation on the user device(s) 102 in a manner that is unaltered from a default presentation for the content item 108. For example, the default presentation of the content item 108 may include no additional information presented with the content item 108, no alteration of the content of the content item 108, or no omission of the content of the content item 108.

If it is determined at 802 that the presentation of the content item 108 is to be altered, the process may proceed to 806. At 806, the content item 108 may be provided for presentation on the user device(s) 102 in a manner that is altered from its default presentation state. For example, in cases where the applied rule(s) 118 determine that the content item 108 includes prurient, obscene, or potentially offensive content, the presentation of the content item 108 may be altered to include descriptive (e.g., warning) text, added color elements (e.g., a red border), or other additional information. Alternatively, the presentation of the content item 108 may be modified to alter or omit the prurient, obscene, or potentially offensive content. As another example, in cases where the applied rule(s) 118 determine that the content item 108 includes copyrighted or trademarked content, the presentation of the content item 108 may be altered to remove such content or to incorporate the appropriate copyright or trademark designations.

At 808, in some implementations one or more additional processes or workflows may be launched based on the altered presentation of the content item 108. For example, a process may be started to remove the content item 108 from any caches or other locations in memory. In some cases at 808, a process may be started to examine clickstream data to generate a report that includes metrics or other information regarding the content item request 104 for the content item 108, such as the number, frequency, or origin of requests received for the content item 108.

Figure 9:
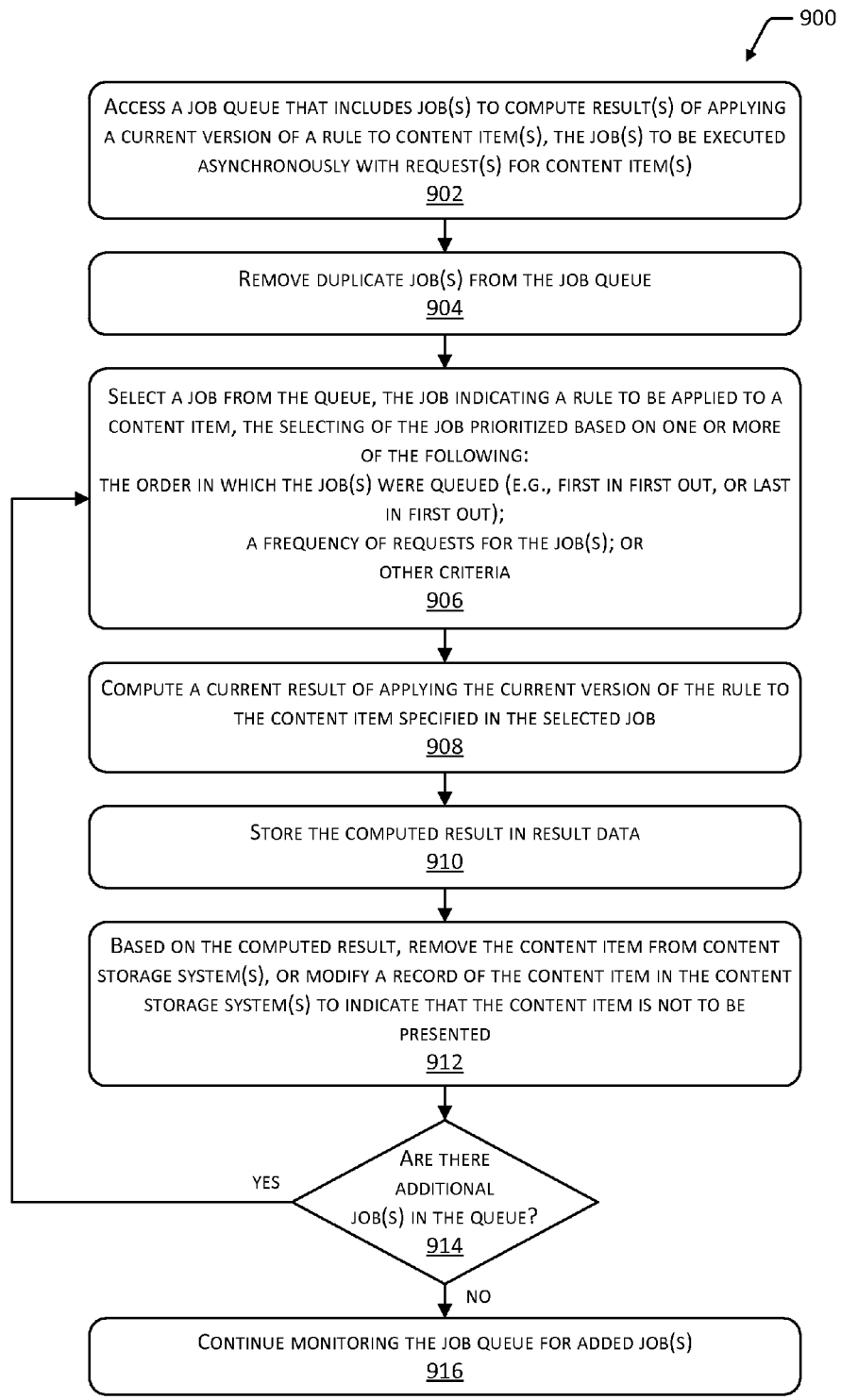
FIG. 9 depicts a flow diagram of a process for managing a queue of jobs to compute current results of applying current versions of rules to various content items.

FIG. 9 depicts a flow diagram 900 of a process for managing the job queue 124. One or more operations of the process may be performed by the content service module 112, the content aggregation module 130, the search module 132, other modules executing on the content server device(s) 110, the content item evaluation module 116, the results computation module 126, other modules executing on the rule application device(s) 114, or modules executing on other devices.

At 902, the job queue 124 is accessed. As described above, the job queue 124 may include one or more jobs that are each executable to compute a result 204 of applying a current version of a rule 118 to a content item 108. The job queue may be configured such that the jobs may be executed asynchronously with respect to the receipt of one or more content item requests 104.

At 904, in some implementations one or more duplicate jobs may be removed from the job queue 124, to prevent the execution of duplicate and redundant jobs to calculate results 204.

At 906, a job is selected from the job queue 124, the job describing a rule 118 to be applied to a content item 108. Implementations support the use of any algorithm to select a job to be executed from the job queue 124. In some cases, the job may be selected based on the order in which the jobs were queued (e.g., added to the job queue 124). For example, the jobs may be executed in a first in, first out order in which earlier queued jobs are executed earlier than other jobs. As another example, the jobs may be executed in a last in, first out order in which the later queued jobs are executed earlier than other jobs. In some cases, the job may be selected based on the frequency or number of requests for the job that were included in the job queue 124 prior to the de-duplication operation at 904. For example, a job that has a larger number of instances in the job queue 124 may be executed with priority relative to other jobs that have a smaller number of instances in the job queue 124. In some cases, a more recently submitted job may be selected first for execution, to reduce a number of instances in which a potentially inappropriate content item 108 may be presented to users.

At 908, the selected job may be executed to compute a current result of applying a current version of a rule 118 to the content item 108 specified in the selected job. At 910, the computed result 204 may be stored in the result data 122 in the data storage 516. After it is executed, the job may be removed from the job queue 124.

At 912, in some implementations the content item 108 may be removed from the content storage system(s) 128 to prevent the content item 108 from being presented in response to subsequent requests for the content item 108. Alternatively, the record for the content item 108 in the content storage system(s) 128 may be flagged or otherwise modified to indicate that the content item 108 is not to be presented.

At 914, a determination is made whether there are additional job(s) to be executed in the job queue 124. If so, the process may return to 906 and select another job to be executed. If not, the process may continue to 916 and continue monitoring for additional jobs added to the job queue 124.

Figure 10:
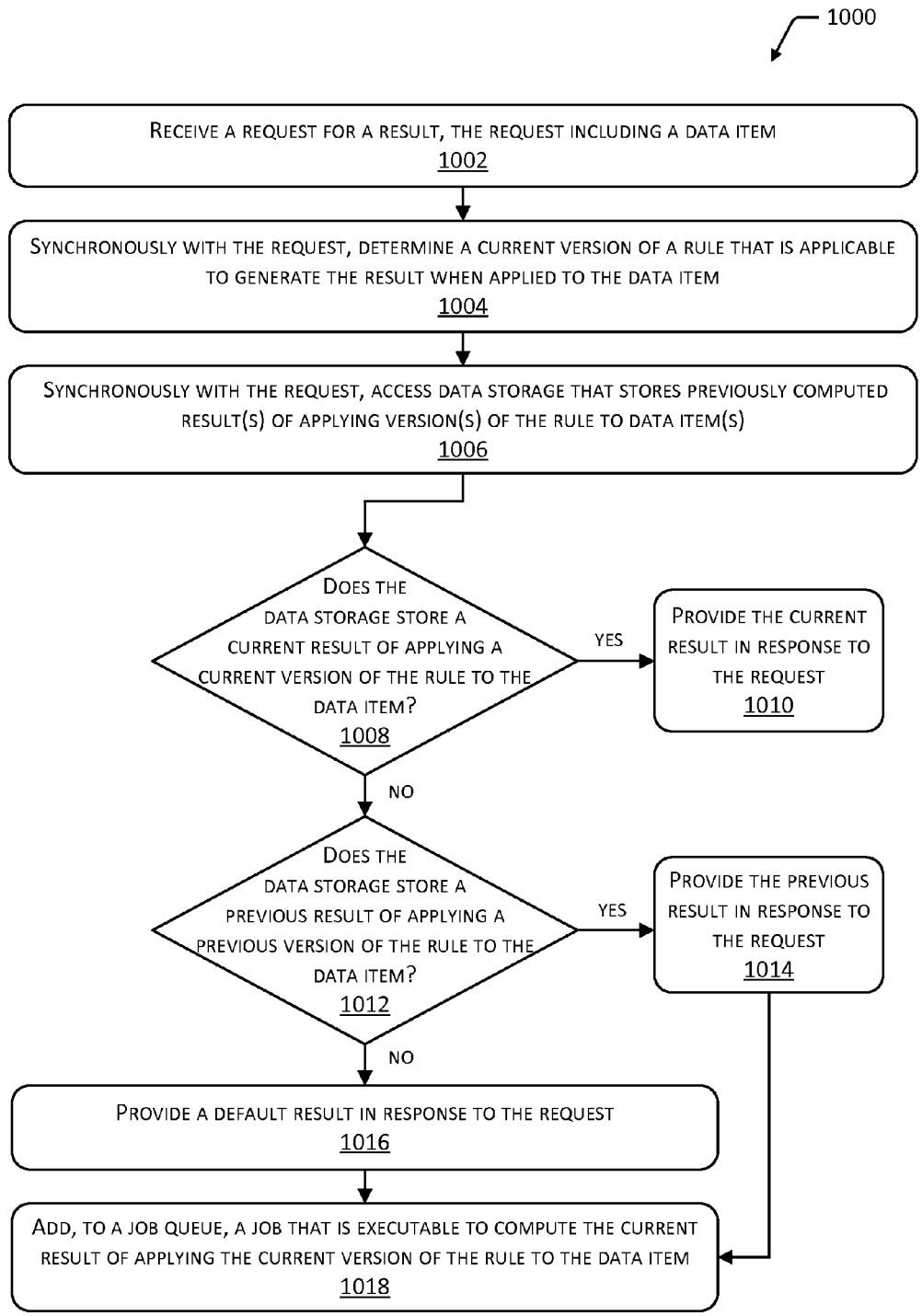
FIG. 10 depicts a flow diagram of a process for employing a stored result in response to a request for a result of applying a rule to a data item, if an appropriate stored result is available, and in some cases queuing a job to compute a current result if the current result of applying a current version of the rule is not otherwise available.

Implementations also support the application of the rules 118 asynchronously to data item(s) of a type other than the content item(s) 108 described above to generate the stored result data 122. FIG. 10 depicts a flow diagram 1000 of a process for employing a stored result 204 in response to a request for a result of applying a rule 118 to a data item, if an appropriate stored result 204 is available, and in some cases queuing a job to compute a current result if the current result of applying a current version of the rule 118 is not otherwise available. One or more operations of the process may be performed by the content service module 112, the content aggregation module 130, the search module 132, other modules executing on the content server device(s) 110, the content item evaluation module 116, the results computation module 126, other modules executing on the rule application device(s) 114, or modules executing on other devices.

At 1002, a request is received, or an indication of a request is received, the request being a request for a result 204 of applying a rule 118 to an input data item, e.g., a request for the result y that is a result of calculating y=f(x) for a rule f based on input data item x. Such a request may be received from a process running on any computing device.

At 1004, a rule 118 may be identified that is applicable to generate the result when applied to the input data item. In some implementations, the identification of the rule 118 may be performed substantially in real time with the receipt of the request for the result 204.

At 1006, the result data 122 may be accessed from the data storage 516. The result data 122 may store precomputed (e.g., previously computed) results 204 of applying rules 118 to data items. In some implementations, the access to the result data 122 may be performed substantially in real time relative to receiving the request for the result 204. Moreover, in some cases one or more of the subsequent operations 1008, 1010, 1012, 1014, 1016, or 1018 may also be performed substantially in real time relative to receiving the request.

At 1008, a determination is made whether the result data 122 stores a current result of applying a current version of the rule 118 to the input data item. If so, the process may proceed to 1010. At 1010, the current result may be retrieved from the result data 122 and provided in response to the request. If the result data 122 does not store a current result, the process may proceed to 1012.

At 1012, a determination is made whether the result data 122 stores a previous result of applying a previous version of the rule 118 to the input data item. If so, the process may proceed to 1014. At 1014, the previous result may be retrieved from the result data 122 and provided in response to the request. After 1014, the process may proceed to 1018. If the result data 122 does not store a previous result, the process may proceed to 1016. As described above, in some implementations the determination of whether the result data 122 includes a current result or a previous result may be made by comparing the rule version ID 202 listed in the rule version data 120 (e.g., the current version of the rule 118) to the rule version ID 202 listed in the portion of the result data 122 corresponding to the rule 118 to be applied and the data item.

At 1016, a default result may be determined if the result data 122 does not include a current result or a previous result of applying the rule 118 to the input data item.

At 1018, a job may be added to the job queue 124. The queued job may be executable to compute the current result of applying the current version of the rule 118 to the data item. The job queue 124 may be managed as described with reference to FIG. 9.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
based on a request for presentation of a content item, determining a rule that is applicable to determine whether the content item is to be presented;
accessing result data including a plurality of results previously computed by applying one or more versions of the rule to a plurality of content items, individual ones of the plurality of results indicating whether individual ones of the plurality of content items are to be presented;
based on determining that the result data stores a current result of applying a current version of the rule to the content item, employing the current result to determine whether the content item is to be presented;
based on determining that the result data stores a previous result of applying a previous version of the rule to the content item:
  employing the previous result to determine whether the content item is to be presented; and
  adding, to a job queue, a job that is executable to compute the current result of applying the current version of the rule to the content item, the job queue including a plurality of jobs to compute the plurality of results asynchronously with a plurality of requests for presentation of the plurality of content items; and
based on determining that the result data does not store the current result or the previous result:
  employing a default result indicating that the content item is to be presented; and
  adding, to the job queue, the job to compute the current result of applying the current version of the rule to the content item.

2. The method of claim 1, wherein:
individual ones of the plurality of results included in the result data are associated with a rule version identifier that indicates a version of the rule applied to previously compute the individual ones of the plurality of results; and
the determining that the result data stores the current result further comprises:
  accessing rule version data that includes the rule version identifier indicating the current version of individual ones of a plurality of rules; and
  determining that the rule version identifier associated with the current result corresponds to the rule version identifier associated with the rule in the rule version data.

3. The method of claim 1, wherein the accessing of the result data is performed substantially synchronously with the request for presentation of the content item.

4. The method of claim 1, further comprising:
removing one or more duplicate jobs from the job queue; and
asynchronously with at least some of the plurality of requests, executing the plurality of jobs in the job queue to compute a plurality of current results by applying the current version of individual ones of a plurality of rules to individual ones of the plurality of content items; and
adding the plurality of current results to the result data.

5. A system, comprising:
at least one hardware computing device configured to implement one or more services,
wherein the one or more services are configured to:
identify a rule that is applicable to determine a presentation of the content item;
access result data including a plurality of results previously computed by applying one or more versions of the rule to a plurality of content items, individual ones of the plurality of results indicating the presentation of individual ones of the plurality of content items;
based on determining that the result data stores a current result of applying a current version of the rule to the content item, employ the current result to determine the presentation of the content item; and
based on determining that the result data does not include the current result:
employ a default result to determine the presentation of the content item; and
add, to a job queue, a job to compute the current result of applying the current version of the rule to the content item, the job queue including a plurality of jobs to compute the plurality of results.

6. The system of claim 5, wherein the one or more services are further configured to:
based on determining that the result data includes a previous result of applying a previous version of the rule to the content item, employ the previous result to determine the presentation of the content item; and
add, to the job queue, the job to compute the current result of applying the current version of the rule to the content item.

7. The system of claim 5, wherein the accessing of the result data and the determining of the presentation of the content item are performed substantially synchronously with receiving a request for the presentation of the content item.

8. The system of claim 5, wherein the one or more services are further configured to:
asynchronously with one or more requests for the plurality of content items, execute the plurality of jobs in the job queue to compute a plurality of current results by applying the current version of individual ones of a plurality of rules to individual ones of the plurality of content items; and
add the plurality of current results to the result data.

9. The system of claim 8, wherein the one or more services are further configured to:
remove one or more duplicate jobs from the job queue.

10. The system of claim 5, wherein the current result is employed to determine the presentation of the content item in one or more of the following:
a web page presented in a web browser on a user device; or
a native application executing on the user device.

11. The system of claim 5, wherein the rule is configured to block the presentation of the content item based on the content item including one or more of:
prurient content;
confidential content associated with one or more users;
potentially offensive content;
trademarked content;
service marked content; or
copyrighted content.

12. The system of claim 5, wherein the current result or the default result are employed to determine that the content item is to be presented or is not to be presented.

13. The system of claim 5, wherein the current result or the default result are employed to modify the presentation of the content item, the modifying including one or more of:
including additional information with the presentation of the content item; or
omitting at least a portion of the content item included in the presentation.

14. One or more non-transitory computer-readable media storing instructions which, when executed by at least one processor, instruct the at least one processor to perform actions comprising:
determining a rule that is configured to generate a result when applied to a data item;
accessing result data including a plurality of results previously computed by applying one or more versions of the rule to a plurality of data items;
based on determining that the result data stores a current result of applying a current version of the rule to the data item,
providing the current result; and
based on determining that the result data does not store the current result:
providing a default result to determine the presentation of the content item; and
adding, to a job queue, a job to compute the current result of applying the current version of the rule to the data item, the job further configured to add the current result to the results data, the job queue including a plurality of jobs to compute the plurality of results asynchronously with a plurality of requests for the plurality of results.

15. The one or more computer-readable media of claim 14, wherein:
the data item is a content item that is electronically presentable to users;
the rule is applicable to determine whether the content item is to be presented; and
providing the current result includes employing the current result to determine whether to present the content item in response to the request.

16. The one or more computer-readable media of claim 14, wherein the actions further comprise:
asynchronously with one or more requests for results, executing the plurality of jobs in the job queue to compute a plurality of current results by applying the current version of individual ones of a plurality of rules to individual ones of a plurality of data items.

17. The one or more computer-readable media of claim 14, wherein the actions further comprise:
removing one or more duplicate jobs from the job queue.

18. The one or more computer-readable media of claim 14, wherein:
individual ones of the plurality of results included in the result data are associated with a rule version identifier that indicates a version of the rule applied to previously compute the individual ones of the plurality of results; and
the determining that the result data includes the current result further comprises:
accessing rule version data that includes the rule version identifier indicating the current version of individual ones of a plurality of rules; and
determining that the rule version identifier associated with the current result corresponds to the rule version identifier associated with the rule in the rule version data.

19. The one or more computer-readable media of claim 14, wherein the determining of the rule and the accessing of the result data is performed substantially synchronously with receiving a request for the result.

20. The one or more computer-readable media of claim 14, wherein the actions further comprise:
based on determining that the result data includes a previous result of applying a previous version of the rule to the data item, providing the previous result; and
adding, to the job queue, the job to compute the current result of applying the current version of the rule to the data item.

* * * * *